No. 631,501. Patented Aug. 22, 1899.
C. GLOVER.
HINGE.
(Application filed Apr. 18, 1899.)
(No Model.)
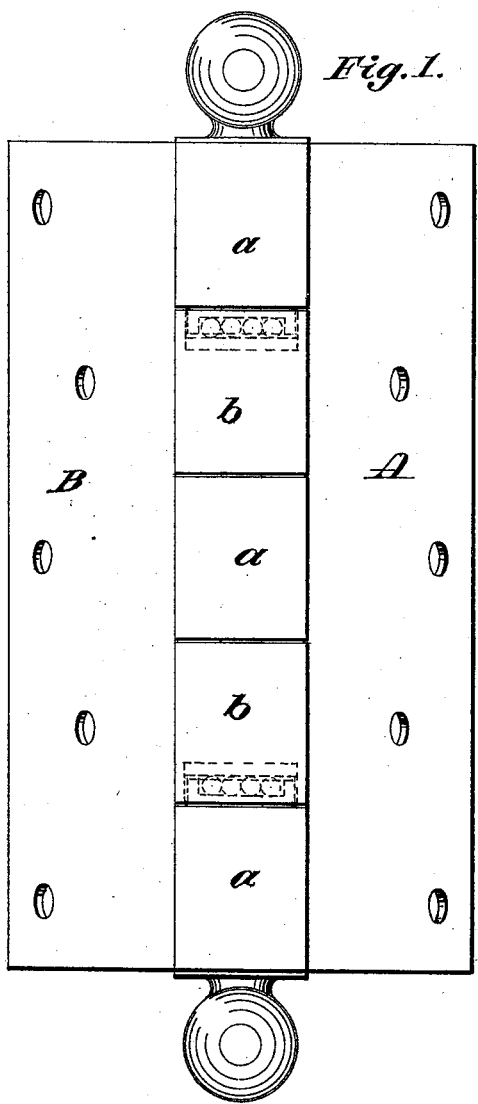
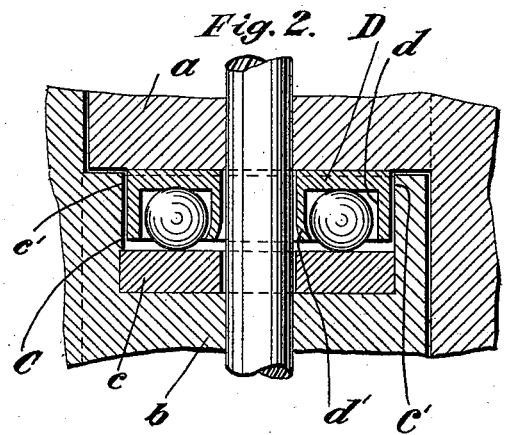
WITNESSES:
Geo. T. Hackley.
INVENTOR
Charles Glover.
BY
ATTORNEY

UNITED STATES PATENT OFFICE.

CHARLES GLOVER, OF NEW BRITAIN, CONNECTICUT, ASSIGNOR TO THE P. & F. CORBIN, OF CONNECTICUT.

HINGE.

SPECIFICATION forming part of Letters Patent No. 631,501, dated August 22, 1899.

Application filed April 18, 1899. Serial No. 713,496. (No model.)

*To all whom it may concern:*

Be it known that I, CHARLES GLOVER, a citizen of the United States, residing at New Britain, county of Hartford, State of Connecticut, have invented certain new and useful Improvements in Hinges, of which the following is a full, clear, and exact description.

My invention relates to improvements in butts and hinges; and my object is to improve the bearing portion thereof, so that the hinge may be easily turned although one of the leaves thereof may support a heavy door.

Other objects of this improvement are to provide a practically dust-proof and practically invisible antifriction-bearing between the knuckles of the hinge and to also provide bearing-surfaces, hardened, if desired, within said recess for said antifriction devices.

In the drawings, Figure 1 is a side elevation of a hinge provided with my improved bearing, the parts of said bearing being shown in dotted lines. Fig. 2 is an enlarged sectional detail of the upper bearing of Fig. 1.

In the preferred embodiment of my invention shown in the drawings, A and B are two leaves of a hinge, of which the leaf A has the knuckles $a\ a\ a$ and the leaf B the knuckles $b\ b$. In the end of the knuckle $b$ is a recess C to contain the antifriction devices, preferably balls, as shown. If the knuckles were formed of some soft metal, such as brass, it would not be feasible to allow the balls to run directly on the metal, as it would soon be worn away. I therefore preferably line this recess with a hardened bearing for the antifriction devices. In this embodiment the bearing consists of a disk $c$ of steel. By "hardened" I merely mean that the lining is harder than the material of the knuckle—for instance, a brass knuckle and a steel or iron lining. I do not mean that such steel or iron lining must necessarily of itself be hardened over what it would be in its natural state. This is preferably fixed in the bottom of the recess, as shown.

D is a second bearing for the antifriction devices, which in this embodiment constitutes a detachable end piece for the adjacent knuckle $a$—that is, the bearing D and the knuckle $a$ rest against each other when the antifriction devices are to support the knuckle.

In the present embodiment the bearing, D is in the form of a cup, in which a channel for the balls is formed by the outer portion $d$ and the inner web $d'$. This channel holds the balls in place and prevents their binding. This inner web is preferably slightly turned outward to hold the balls in the channel so that they will not drop out when the cup is removed. The bearing D is also preferably hardened. It will be observed that when the balls are supporting the knuckle above them the walls $c'\ c'$ of the recess extend slightly beyond their exposed surfaces. This allows the bearing D to enter said recess to a slight extent, and preferably it should not project above the upper edge of the wall of the recess except just enough to support the knuckle $a$ and keep the same from contact with the end of the knuckle $b$. I have shown in the drawings the space between the knuckles as considerably exaggerated. In practice the space is hardly visible.

It will be observed that by this construction I provide an antifriction-bearing which is practically dust-proof, as the bearing D fits the recess closely, and also practically invisible, so that the hinge apparently has a continuous knuckle without any space between the adjacent ends or any visible antifriction devices. I am also enabled to provide the antifriction devices with an upper and a lower hardened bearing without recessing but one knuckle, and I am not obliged to make the space between the ends of the knuckles appreciable.

It will be obvious that many changes may be made in the construction herein disclosed without departing from the spirit or scope of my invention.

What I claim is—

1. In a hinge a plurality of leaves each of the same having a knuckle, a recess in the end of one of said knuckles, a detachable end piece for the end of the adjacent knuckle consisting of a cup-shaped receptacle adapted to partially enter and fit said recess, antifriction-balls between said receptacle and the bottom of said recess, the wall of said recess extending beyond the exposed surfaces of said balls when the parts are in their operative position.

2. In a hinge a plurality of leaves each of the same having a knuckle, a recess in the end of one of said knuckles, a detachable end piece for the end of the adjacent knuckle consisting of a cup-shaped receptacle having a channel therein and adapted to partially enter and fit said recess, antifriction-balls in said channel between said receptacle and the bottom of said recess, the wall of said recess extending beyond the exposed surfaces of said balls when the parts are in their operative position, said cup-shaped receptacle having a central web for forming the inner side of said channel.

Signed at New Britain, Connecticut, this 15th day of April, 1899.

CHARLES GLOVER.

Witnesses:
G. ERNEST ROOT,
C. A. BLAIR.